(12) United States Patent
Pearson et al.

(10) Patent No.: US 10,542,684 B2
(45) Date of Patent: *Jan. 28, 2020

(54) MODULAR IRRIGATION CONTROLLER

(71) Applicant: The Toro Company, Bloomington, MN (US)

(72) Inventors: Randall Pearson, Chino Hills, CA (US); Burnett Jones, Corona, CA (US); Jack McIntosh, El Cajon, CA (US); Brian Edward Ries, Bloomington, MN (US); Jeffrey A. Miller, Murrieta, CA (US); Noel Macasias, La Puente, CA (US); Eric Pettet, Riverside, CA (US); Tong Le, Riverside, CA (US); Michael Jackson, Highlands Ranch, CO (US)

(73) Assignee: The Toro Company, Bloomington, MN (US)

( * ) Notice: Subject to any disclaimer, the term of this patent is extended or adjusted under 35 U.S.C. 154(b) by 268 days.

This patent is subject to a terminal disclaimer.

(21) Appl. No.: 15/402,170

(22) Filed: Jan. 9, 2017

(65) Prior Publication Data

US 2017/0118929 A1 May 4, 2017

Related U.S. Application Data

(63) Continuation of application No. 13/942,550, filed on Jul. 15, 2013, now Pat. No. 9,538,713.

(60) Provisional application No. 61/671,522, filed on Jul. 13, 2012.

(51) Int. Cl.
*A01G 25/16* (2006.01)
*G05B 15/02* (2006.01)

(52) U.S. Cl.
CPC .......... *A01G 25/165* (2013.01); *A01G 25/16* (2013.01); *G05B 15/02* (2013.01)

(58) Field of Classification Search
CPC ....... A01G 25/165; A01G 25/16; G05B 15/02
See application file for complete search history.

(56) References Cited

U.S. PATENT DOCUMENTS

| | | | |
|---|---|---|---|
| 2,688,056 | A | 8/1954 | Kettering et al. |
| 3,653,595 | A | 4/1972 | Greengard, Jr. et al. |
| 3,808,385 | A | 4/1974 | Klinefelter |
| 3,869,854 | A | 3/1975 | Church |
| 3,951,339 | A | 4/1976 | DeFresne |
| 4,007,458 | A | 2/1977 | Hollabaugh |
| 4,064,507 | A | 12/1977 | Schmitz |

(Continued)

OTHER PUBLICATIONS

"Rain8net Pro2 master module installation Instructions", WGL & Associates, http://wgldesigns.com/downloads/41012.pdf (Year: 2012).*

(Continued)

*Primary Examiner* — Charles R Kasenge
(74) *Attorney, Agent, or Firm* — Inskeep IP Group, Inc.

(57) ABSTRACT

A controller has two irrigation station module connection areas within it and can either accept two irrigation station modules at the same time or one larger module that spans both connection areas. The larger module, however, includes more irrigation station terminals than both of the smaller irrigation station modules combined. Therefore, a greater number of irrigation stations can be connected to the controller when the larger module is substituted for the two smaller modules.

16 Claims, 16 Drawing Sheets

(56) References Cited

U.S. PATENT DOCUMENTS

| | | | |
|---|---|---|---|
| 4,090,764 A | 5/1978 | Malsby et al. |
| 4,131,882 A | 12/1978 | Hillabaugh et al. |
| 4,152,750 A | 5/1979 | Bremenour et al. |
| 4,176,395 A | 11/1979 | Evelyn-Veere et al. |
| 4,209,131 A | 6/1980 | Barash et al. |
| 4,242,721 A | 12/1980 | Krolak et al. |
| 4,263,902 A | 4/1981 | Dieterich |
| 4,313,042 A | 1/1982 | Ehrhart |
| 4,396,149 A | 8/1983 | Hirsch |
| 4,545,396 A | 10/1985 | Miller et al. |
| 4,548,225 A | 10/1985 | Busalacchi |
| 4,569,020 A | 2/1986 | Snoddy et al. |
| 4,655,076 A | 4/1987 | Weihe et al. |
| 4,670,547 A | 6/1987 | Lehr |
| 4,672,510 A | 6/1987 | Castner |
| 4,684,920 A | 8/1987 | Reiter |
| 4,690,020 A | 9/1987 | Sasano et al. |
| 4,810,897 A | 3/1989 | Shotey |
| 4,852,051 A | 7/1989 | Mylne, III |
| 4,862,701 A | 9/1989 | Small et al. |
| 4,895,303 A | 1/1990 | Freyvogel |
| 4,922,407 A | 5/1990 | Birk et al. |
| 4,922,433 A | 5/1990 | Mark |
| 4,937,732 A | 6/1990 | Brundisini |
| 5,021,939 A | 6/1991 | Pulgiese |
| 5,048,755 A | 9/1991 | Dodds |
| 5,060,859 A | 10/1991 | Bancroft |
| 5,087,866 A | 2/1992 | Smith |
| 5,097,861 A | 3/1992 | Hopkins et al. |
| 5,101,083 A | 3/1992 | Tyler et al. |
| 5,173,855 A | 12/1992 | Nielsen et al. |
| 5,262,936 A | 11/1993 | Faris et al. |
| 5,265,005 A | 11/1993 | Schmidt et al. |
| 5,272,620 A | 12/1993 | Mock et al. |
| 5,278,749 A | 1/1994 | DeMan |
| 5,293,554 A | 3/1994 | Nicholson |
| 5,333,785 A | 8/1994 | Dodds et al. |
| 5,335,122 A | 8/1994 | An |
| 5,337,957 A | 8/1994 | Olson |
| 5,337,959 A | 8/1994 | Boyd |
| 5,363,290 A | 11/1994 | Doup et al. |
| 5,381,331 A | 1/1995 | Mock et al. |
| 5,410,717 A | 4/1995 | Floro |
| 5,414,618 A | 5/1995 | Mock et al. |
| 5,421,738 A | 6/1995 | Roberts |
| 5,424,649 A | 6/1995 | Gluck et al. |
| 5,465,904 A | 11/1995 | Vaello |
| 5,479,338 A | 12/1995 | Ericksen et al. |
| 5,568,376 A | 10/1996 | Benmergui et al. |
| 5,602,728 A | 2/1997 | Madden et al. |
| 5,651,500 A | 7/1997 | Patterson et al. |
| 5,740,031 A | 4/1998 | Gagnon |
| 5,813,606 A | 9/1998 | Ziff |
| 5,821,864 A | 10/1998 | Knop et al. |
| 5,834,693 A | 11/1998 | Waddell et al. |
| 5,836,339 A | 11/1998 | Klever et al. |
| 5,839,658 A | 11/1998 | Sarver |
| 5,853,122 A | 12/1998 | Caprio |
| D407,656 S | 4/1999 | Klever |
| 5,956,248 A | 9/1999 | Williams et al. |
| 6,016,971 A | 1/2000 | Welch et al. |
| 6,088,621 A | 7/2000 | Woytowitz et al. |
| 6,256,191 B1 | 7/2001 | Curlee |
| 6,298,285 B1 | 10/2001 | Addink et al. |
| 6,314,340 B1 | 11/2001 | Mecham et al. |
| 6,401,530 B1 | 6/2002 | Roman |
| 6,452,499 B1 | 9/2002 | Runge et al. |
| 6,459,959 B1 | 10/2002 | Williams et al. |
| 6,490,505 B1 | 12/2002 | Simon et al. |
| 6,507,775 B1 | 1/2003 | Simon et al. |
| 6,570,109 B2 | 5/2003 | Klinefelter et al. |
| 6,647,319 B1 | 11/2003 | Goldberg |
| 6,694,195 B1 | 2/2004 | Garcia |
| 6,721,630 B1 * | 4/2004 | Woytowitz ......... G05B 19/0421 239/69 |
| 6,766,221 B1 | 7/2004 | Christiansen |
| 6,772,050 B2 | 8/2004 | Williams et al. |
| 6,782,310 B2 | 8/2004 | Bailey et al. |
| 6,823,239 B2 | 11/2004 | Sieminski |
| 6,898,467 B1 | 5/2005 | Smith et al. |
| 6,944,523 B2 | 9/2005 | Addink et al. |
| 6,977,351 B1 | 12/2005 | Woytowitz |
| 6,982,114 B2 | 1/2006 | Crum |
| 6,996,457 B2 | 2/2006 | Williams et al. |
| 7,058,479 B2 | 6/2006 | Miller |
| 7,069,115 B1 | 6/2006 | Woytowitz |
| 7,125,146 B2 | 10/2006 | Willis et al. |
| 7,181,319 B1 | 2/2007 | Woytowtiz |
| 7,225,057 B2 | 5/2007 | Froman et al. |
| 7,225,058 B1 | 5/2007 | Porter |
| 7,243,005 B1 | 7/2007 | Beutler et al. |
| 7,257,465 B2 | 8/2007 | Perez et al. |
| 7,289,886 B1 | 10/2007 | Woytowitz |
| 7,444,207 B2 | 10/2008 | Nickerson et al. |
| 7,526,365 B1 | 4/2009 | Frerich et al. |
| 7,574,285 B2 * | 8/2009 | Kah, Jr. ......... A01G 25/16 137/624.11 |
| 7,613,546 B2 | 11/2009 | Nelson et al. |
| 7,613,547 B1 | 11/2009 | Woytowitz |
| 7,640,079 B2 | 12/2009 | Nickerson et al. |
| 7,778,736 B2 | 8/2010 | Sutardja |
| 7,792,612 B2 * | 9/2010 | Kah, Jr. ......... A01G 25/16 137/624.11 |
| 7,844,367 B2 | 11/2010 | Nickerson et al. |
| 7,844,369 B2 | 11/2010 | Nickerson |
| 7,899,581 B1 | 3/2011 | Woytowitz |
| 7,916,458 B2 | 3/2011 | Nelson et al. |
| 7,996,115 B2 | 8/2011 | Nickerson et al. |
| 8,244,404 B2 | 8/2012 | Nickerson |
| 8,265,797 B2 | 9/2012 | Nickerson et al. |
| 8,271,144 B2 * | 9/2012 | Kah, Jr. ......... A01G 25/16 137/624.11 |
| 8,417,390 B2 | 4/2013 | Nickerson et al. |
| 9,538,713 B2 * | 1/2017 | Pearson ......... A01G 25/16 |
| 2001/0049563 A1 | 12/2001 | Addink et al. |
| 2002/0091452 A1 | 7/2002 | Addink et al. |
| 2003/0093159 A1 | 5/2003 | Sieminski |
| 2003/0120393 A1 | 6/2003 | Bailey et al. |
| 2003/0208306 A1 | 11/2003 | Addink et al. |
| 2004/0015270 A1 | 1/2004 | Addink et al. |
| 2004/0089346 A1 | 5/2004 | Sutardja |
| 2005/0038529 A1 | 2/2005 | Perez et al. |
| 2005/0055106 A1 | 3/2005 | Beutler et al. |
| 2005/0171646 A1 | 8/2005 | Miller |
| 2005/0267641 A1 | 12/2005 | Nickerson et al. |
| 2005/0273205 A1 | 12/2005 | Nickerson et al. |
| 2007/0005370 A1 | 1/2007 | Elshout |
| 2007/0208462 A1 * | 9/2007 | Kah ......... A01G 25/16 700/284 |
| 2008/0027587 A1 | 1/2008 | Nickerson et al. |
| 2008/0058964 A1 | 3/2008 | Nickerson et al. |
| 2008/0071426 A1 | 3/2008 | Perez et al. |
| 2008/0288117 A1 | 11/2008 | Nickerson |
| 2008/0319585 A1 | 12/2008 | Nickerson et al. |
| 2009/0292401 A1 * | 11/2009 | Kah, Jr. ......... A01G 25/16 700/284 |
| 2010/0100247 A1 | 4/2010 | Nickerson et al. |
| 2010/0145531 A1 | 6/2010 | Nickerson et al. |
| 2010/0305765 A1 | 12/2010 | Sutardja |
| 2011/0035064 A1 * | 2/2011 | Kah, Jr. ......... A01G 25/16 700/284 |
| 2011/0040415 A1 | 2/2011 | Nickerson et al. |
| 2011/0040416 A1 | 2/2011 | Nickerson |
| 2011/0270449 A1 | 11/2011 | Nickerson et al. |
| 2011/0320050 A1 | 12/2011 | Petite et al. |
| 2013/0085619 A1 | 4/2013 | Howard |
| 2013/0158724 A1 | 6/2013 | Nickerson et al. |

OTHER PUBLICATIONS

"Rain8net Pro2 master module installation Instructions", WGL & Associates, http://wgldesigns.com/downloads/41020.pdf (Year: 2008).*

(56) References Cited

OTHER PUBLICATIONS

"Solutions for Quality Automation Control", WGL & Associates, http://www.wgldesigns.com/ (Year: 2011).*
United States Patent and Trademark Office, Notice of Allowance dated Sep. 6, 2016 in U.S. Appl. No. 13/942,550, 7 pages.
United States Patent and Trademark Office, Final Office Action dated Apr. 20, 2016 in U.S. Appl. No. 13/942,550, 11 pages.
United States Patent and Trademark Office, Office Action dated Sep. 22, 2015 in U.S. Appl. No. 13/942,550, 13 pages.
Dukes, Michael D. et al., "Residential Irrigation System Rainfall Shutoff Devices," University of Florida IFAS Extension, Aug. 2002, 7 pages.
Hunter Rain-Clik Rain Sensors, 2002, 3 pages, Hunter Industries Incorporated, San Marcos, CA.
New Plus+ Model, 2002, 2 pages, R&D Engineering, Inc., Manasquan, NJ.
Trenholm, L.E. et al., "How to Calibrate Your Sprinkler System," University of Florida IFAS Extension, Jan. 2001, 4 pages.
LEIT 8000 Universal Control Unit (LEIT 8000-2), Solatrol Catalog, Feb. 1995, 1 page, Solatrol Inc., USA.
Buckner Irrigation Equipment Catalog, 1995, 5 pages, Buckner, USA.
Expanded Light-Energized Installation, LEIT8000 Light Energized Irrigation Technology Control System Catalog, Jan. 1995, 1 page, Solatrol (now Dig Corp.), USA.
Researchers Develop Automated Surface Irrigation System, NTIS Tech Notes, 1995, 1 page NTN83-0860, NTIS, US Dept of Commerce, USA.
XKit Expander Module Kit (Series 8700), Solatrol Catalog, Feb. 1995, 1 page, Solatrol Inc., USA.
Motorola, Scorpion AC, TOC and Secs. 1-3, Sep. 1994, Technical Writing Services, Motorola, Inc., Schaumburg, IL.
Rain Bird, Central Control System, Maxicom, Jun. 1994, pp. 2-8, Rain Bird Sales, Inc., Tucson, AZ.
Rain Bird, Components of the Maxicom System, Feb. 9, 1994, p. 3.2, Section 3, US.
Motorola, MIR5000C Quickstart and Reference Guide, Feb. 1994, Technical Writing Services, Motorola, Inc., Schaumburg, IL.
Rain Bird, Maxicom Guide to Operations, Oct. 1994, Chapter 7, US.
Motorola, IRRInet Component Descriptions, Feb. 16, 1993, 10 Pgs., Megeath.
Rain Bird, Central Control System, Maxicom—Guide to Operations, Feb. 1993, TOC and pp. 5.4-1-2; 5.4-41-42;7.2-1-2; Rain Bird Sales, Inc., Tucson, AZ.
Motorola, IRRInet General Description Service Manual 1+75rs., 1993, Technical Writing Services, Motorola, Inc., Schaumburg, IL.
Rain Bird, Central Computer Control System, Maxicom, "Landscape Irrigation Products, 1993-1994 Catalog," pp. 98-99, US.
Motorola Communications Sector, I/O Module 4 Digital Inputs/16 Solid-State Outputs, 1992, 12 pgs., Technical Writing Services, Motorola, Inc., Schaumburg, IL.
Motorola IRRInet CPU Module Service Manual, 1992, Motorola, Inc., Schaumberg, IL.
Motorola IRRInet Irrigation Field Unit Owner's Manual 1992 ("IRRInet"), Technical Writing Services, Motorola, Inc., Schaumberg, IL.
Motorola, Irrigation Field Unit Owner's Manual, TOC and Secs. 1-3, 1992, Technical Writing Services, Motorola Communications Israel, Ltd., Tel Aviv, Israel.
Motorola, IRRInet Owner's Manual, 1992, TOC and Secs. 1-3, Motorola Communications Israel Ltd., Tel Aviv, Israel.
Motorola, MIR5000C Central System Operating Instructions, 1991, Technical Writing Services, Motorola Communications Israel Ltd., Tel Aviv, Israel.
Pro 8430 and 8420 Series Automatic Irrigation Controllers, L.R. Nelson Corp. Catalog, 1991, 2 pages, L.R. Nelson Corporation, USA.
The Strong Box, Stainless Steel Controller Enclosure, 1991, 10 pgs., V.I.T. Products, Inc., San Diego, CA.
Toro, Motorola MIR 5000 Radio-Based Irrigation Central Computer Control System, 1991, pp. 1-4, The Toro Company, Riverside, CA.
Maxicom Computer Control System, Rain Bird Catalog, 1990, 4 pages, Rain Bird Sprinkler Mfg. Corp, USA.
Modular Solid State Controllers, Buckner Water Management by Design Catalog, May 1990, 8 pages, USA.
Toro 1990 Irrigation Products Catalog, 1990, 3 pages, The Toro Company, Riverside, CA.
Weather-matic 1990-91 Irrigation Equipment Catalog, 1990-91, 3 pages, Weather-matic, USA.
Motorola, MIR 5000C System Installation Section, 1989, Technical Writing Services, Motorola Communications Israel Ltd., Tel Aviv, Israel.
Model 39624 Pedestal Mount Field Controller, Model 39625 Wall Mount Field Controller, Royal Coach/Buckner Catalog, Jan. 1983, 1 page, Litho, USA.
Sales Offices and Warehouses, Royal Coach/Buckner Catalog, Jan. 1983, 1 page, Sheet No. 280-286, Litho, USA.
Motorola, MIR5000 Radio Linked Central Irrigation Control System Planner, Mar. 8, 1993, TOC and pp. 1-42, The Toro Company, Riverside, CA.
Motorola, Motorola MIR-5000 Component Descriptions, Feb. 16, 1993, 5 pgs., Megeath.
Motorola, Motorola MIR5000 System Features, Nov. 1991, 20 Pgs., San Diego Turf & Irrigation, San Diego, CA.
Features and Functions of the 39824/5 Field Controller, Buckner Catalog, 5 pages, USA.
Koala-T Irrigation Controller Photos, P1010983 thru P1010989, Oasis Control Systems, Inc., Chatsworth, CA.
Landscaper Irrigation Controller 12 and 16 Stations, Oasis Controls Specification Sheet, 2 pages, OSS-005B, Philmac PTY LTD, USA.
Modular Series Electronic Controllers, Buckner Catalog, 3 pages, USA.
Moody Automatic Controllers, Moody Catalog, 3 pages, Moody, USA.
Motorola, New Members to the MIR5000 Family, Irrinet and Scorpio, 14 pgs., The Toro Company, Riverside, CA.
Pro 8430, 8420 & Pro 8900 Series Controllers, Nelson Irrigation Corp. Catalog, 4 pages, USA.
PTC81 Professional Turf Controller 6 Station, Oasis Controls Specification Sheet, 2 pages, OSS-006A (SP), Philmac PTY LTD, USA.
PTC82 Professional Turf Controller 12 and 18 Stations, Oasis Controls Specification Sheet, 2 pages, OSS-007A (SP), Philmac PTY LTD, USA.
PTC83 Professional Turf Controller 24, 30, 36, 42 Stations, Oasis Controls Specification Sheet, 2 pages, OSS-008A (SP), Philmac PTY LTD, USA.
Toro/Motorola, General Description, Service Manual, IRRInet, 24 pgs., The Toro Company, Riverside, CA.
Vantage Pro Catalog, Davis Instruments, 3 pages.

* cited by examiner

| | Homeowner Screen | Contractor Screen |
|---|---|---|
| Area Screen | *Don't show a screen for area details for the Homeowner.* |  |

MODULAR IRRIGATION CONTROLLER

RELATED APPLICATIONS

This application is a continuation of and claims priority to U.S. patent application Ser No. 13/942,550 filed Jul. 15, 2013 (issuing as U.S. Pat. No. 9,538,713 on Jan. 10, 2017), which claims benefit of and priority to U.S. Provisional Application Ser. No. 61/671,522 filed Jul. 13, 2012 entitled Modular Irrigation Controller, both of which are hereby incorporated herein by reference in their entireties.

BACKGROUND OF THE INVENTION

Irrigation systems are commonly used to compensate for inadequate rainfall by artificially watering turf or other landscape. In their most basic form, irrigation systems comprise water supply lines that direct water to a group of sprinklers. Each sprinkler is placed at varying positions around the landscape, preferably maximizing the area on which water is disbursed.

Control of each sprinkler is typically left to valves coupled to the water supply lines, preventing or allowing water to flow to each of the sprinkler heads. In some residential and commercial irrigation systems, electrically controlled solenoid valves are operatively connected to an irrigation controller or central computer. These irrigation controllers include a microprocessor with an input interface (such as a dial and buttons) where a user can program a desired watering schedule. When the watering schedule calls for irrigation of at least a portion of the landscape, the irrigation controller causes one or more solenoid valves to open so that water flows to their respective sprinklers. When the schedule calls for an end to the irrigation, the irrigation controller causes the solenoid valves to close, stopping the water flow to the sprinklers.

Early irrigation controllers included a fixed number of terminals in which to connect the irrigation system's solenoid valves, as seen in U.S. Pat. No. 5,060,859, the contents of which are hereby incorporated by reference. While functional, these early irrigation controllers lacked the flexibility to connect and control additional valves. Unfortunately, if a user wished to expand their irrigation system, it required either a new irrigation controller with a greater number of valve terminals or the use of multiple irrigation controllers or a second smaller station count controller.

In an effort to increase the flexibility of irrigation controllers, the modular irrigation controller was invented to easily increase the number of sprinklers that can be added to an irrigation system, as seen in U.S. Pat. Nos. 5,956,248; 6,459,959; 6,772,050, the contents of which are hereby incorporated by reference. In a modular irrigation controller, multiple valve leads or irrigation station leads are connected to small modules that removably connect to the controller. Additional station output modules can later be added or removed from the controller as needed.

Prior art modular controllers, however, have numerous drawbacks. For example, older prior art modular controllers typically include modules with a set number of irrigation station terminals. Newer prior art modular controllers increase the number of terminals, but require additional footprint space (e.g., a 4 terminal module may be replaced with a 9 terminal module but requires two module slots.

These prior art modular controllers typically require the modules to be inserted into the controller slots in a specific position order. Further, present day controllers typically do not retain programming information for a module slot after the module is removed.

Some controllers have addressed the issue of a fixed number of terminals within a single controller footprint through the use of modules that include additional terminals and a sensor terminal bank, as seen in patent application Ser. No. 13/073,749, and incorporated herein by reference. However, many conventional irrigation controllers do not have modular slots or a dedicated sensor port. These controllers do not have the capability to switch the fixed station terminals from a conventional 24V AC driven station to an AC or DC driven decoder system. Certain sensors conform to a decoder protocol and are thus not compatible with the conventional 24V AC driven stations. Thus, there exists a need for a controller with the ability to switch the terminals from conventional outputs to decoder outputs to incorporate sensor data for irrigation schedule modification. Additionally, modular controllers are expensive, so providing an economical method of converting fixed stations to decoder driven stations would provide users with a practical alternative while enhancing system flexibility.

Conventional irrigation controllers have not been designed for multiple users with varying levels of controller programming expertise. Thus, to accommodate the advanced users, conventional controllers typically have a complicated menu system to encompass all features of a system, even if a majority of the features would not be utilized by a typical owner operator. There exists a need for a controller that provides a straightforward user interface for the basic user (for example, a typical homeowner) while also providing the advanced user (such as a contractor) with all the features of the controller system.

Additionally, existing controller schedules may not intuitively provide the user with a proper understanding of the time and duration that their irrigation system will be active. Simply listing the program's start and stop times can be improved by providing the schedule in a graphical format based on the day or week. Further, providing information such as past usage provides users with valuable information for modifying an upcoming schedule.

Users may also encounter difficulties in correcting a system problem because the instruction manual, like the typical controller menu system, may be complicated. In instances where an irrigation system requires immediate correction, owner-operators would benefit significantly from the ability to communicate directly with a contractor or customer service representative (CSR). There may be several ways to communicate the problem with the scheduling program. For example, an irrigation controller with an integrated voice line would allow a customer representative to walk the user through the trouble shooting process. Alternatively, a controller with an integrated data upload feature would allow the user to relay program data directly to a CSR to review the program, modify it accordingly, and download any changes directly to the controller. A controller with the ability to communicate to a CSR would ensure that any irrigation system problems were promptly resolved.

Many prior art controllers do not store data relating to scheduling information, sensor readings, or communication events with customer service. Further, the controllers that do store information on a removable device are typically stored within the module itself. While the module may be used in another controller, review of the stored data is limited to being present at a controller. What is needed is a controller that stores data on a common external memory device such as a USB storage device, SD card, micro SD card, or network server to allow an owner-operator to review triggering events and make any necessary modifications to the schedule or program. Data collected would also allow an owner-operator to save irrigation schedules for later use and trouble shoot any controller issues, from a remote location.

What is needed is a modular controller that overcomes the limitations of the prior art. More particularly, a modular controller is needed that can utilize modules with various numbers of irrigation terminals, yet maintain a single slot footprint. A modular controller is also needed that can expand the number of terminals and add sensor or smart adapter capability, save module programming, and decrease the cost associated with producing both an outdoor and indoor model. Further, a modular controller is needed that allows fixed station terminals to be converted to a decoder driven system, allows for real time direct customer service communication via voice or data protocol, and allows sensor and system information to be stored on a readily available removable storage device. In addition, a modular controller is needed that provides a user interface designed for multiple users that is capable of displaying a daily or weekly watering schedule in a graphical format to modify and review past and future irrigation schedules.

SUMMARY OF THE INVENTION

One aspect of the present invention includes a controller that has two irrigation station module connection areas within it. The controller can either accept two irrigation station modules at the same time or one larger module that spans both connection areas. The larger module, however, includes more irrigation station terminals than both of the smaller irrigation station modules combined. Therefore, a greater number of irrigation stations can be connected to the controller when the larger module is substituted for the two smaller modules.

Another aspect of the present invention includes a smart card that connects to an adapter port on the controller to provide additional functionality. For example the smart card may provide any combinations of a wireless transceiver for communicating with a weather station, soil moisture sensor, ET data, flow sensor, remote control, or PC.

Another aspect of the present invention includes a terminal within the controller that can be switched between a standard irrigation station terminal and a two-wire encoder/decoder station.

Another aspect of the present invention includes a user interface that can be switched between a simplified version for a home user and a more detailed version for a professional contractor. In this respect, more detailed configuration options are available to the contractor or advanced user while being hidden to a less experienced home user.

Another aspect of the present invention includes a user interface that can display a graphical schedule that illustrates irrigation via a vertical time scale. Solid blocks indicate standard activation of a valve while cross-hatched blocks indicate possible irrigation based on sensor input. In this respect, the user can quickly view their irrigation schedule in one representational graphic to ensure their turf is receiving proper irrigation volume.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DETAILED DESCRIPTION OF THE INVENTION

Figure 1:
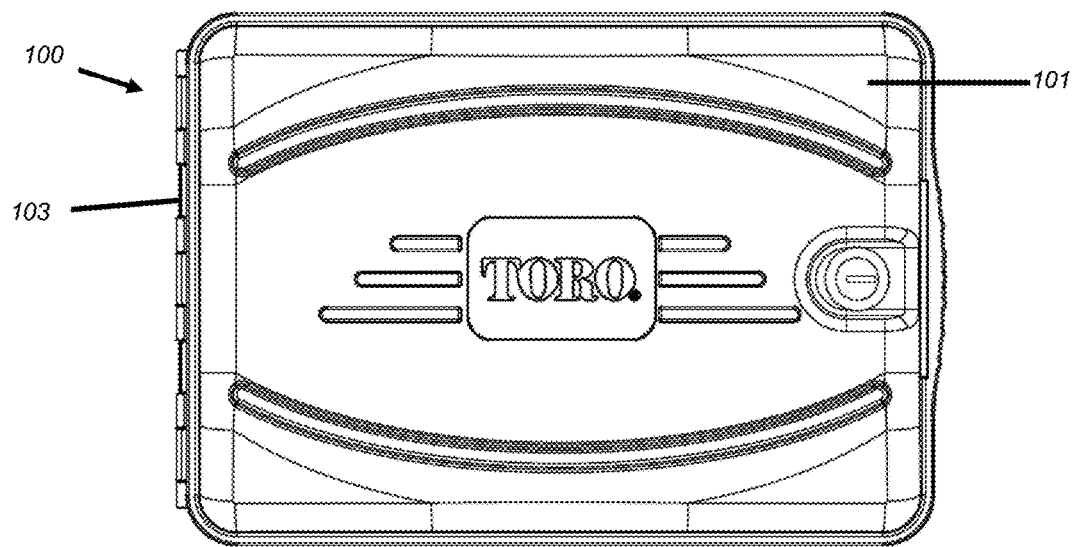
FIG. 1 illustrates a front view of a modular controller according to the present invention.
Figure 2:
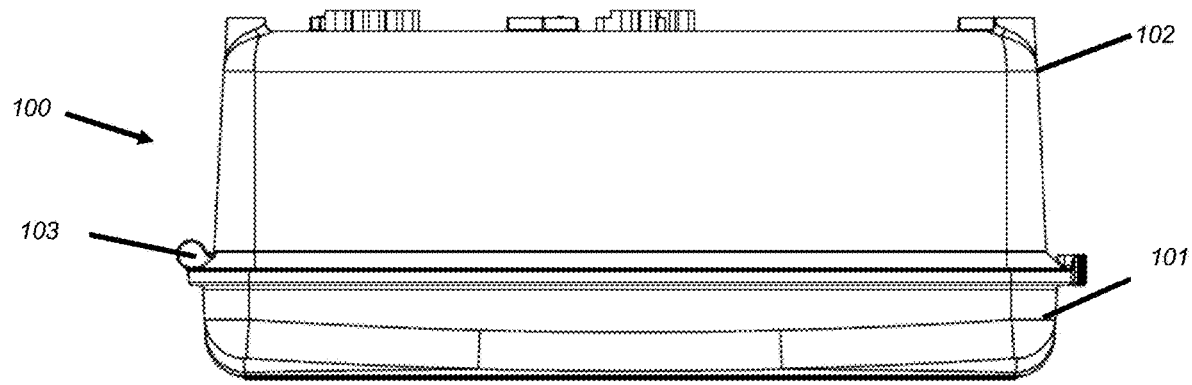
FIG. 2 illustrates a top perspective view of the modular controller of FIG. 1.
Figure 3:
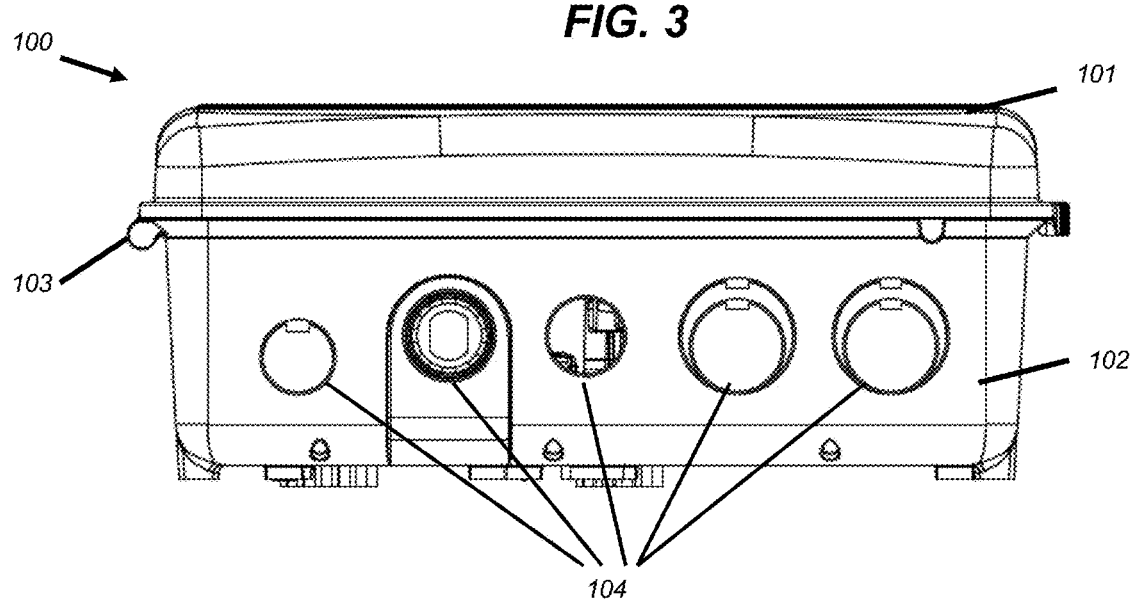
FIG. 3 illustrates a bottom perspective view the modular controller of FIG. 1.
Figure 4:
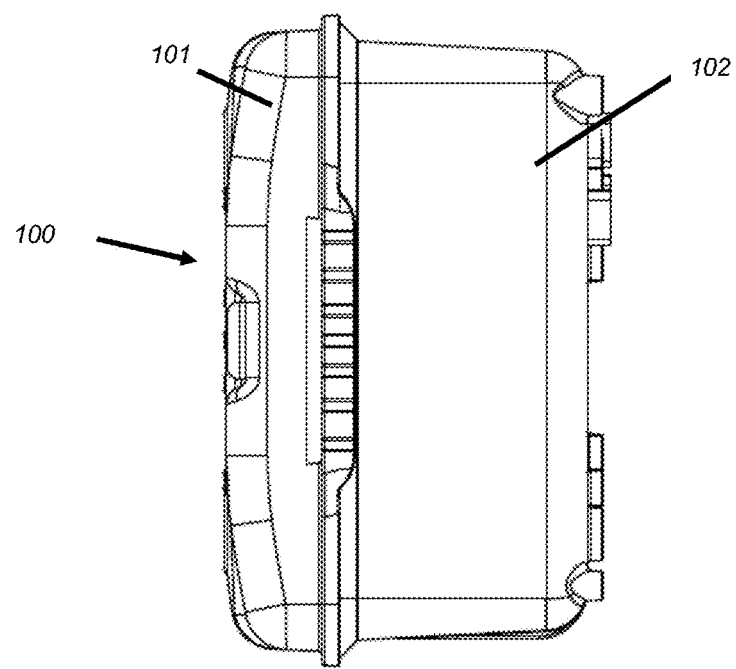
FIG. 4 illustrates a side perspective view of the modular controller of FIG. 1.
Figure 5:
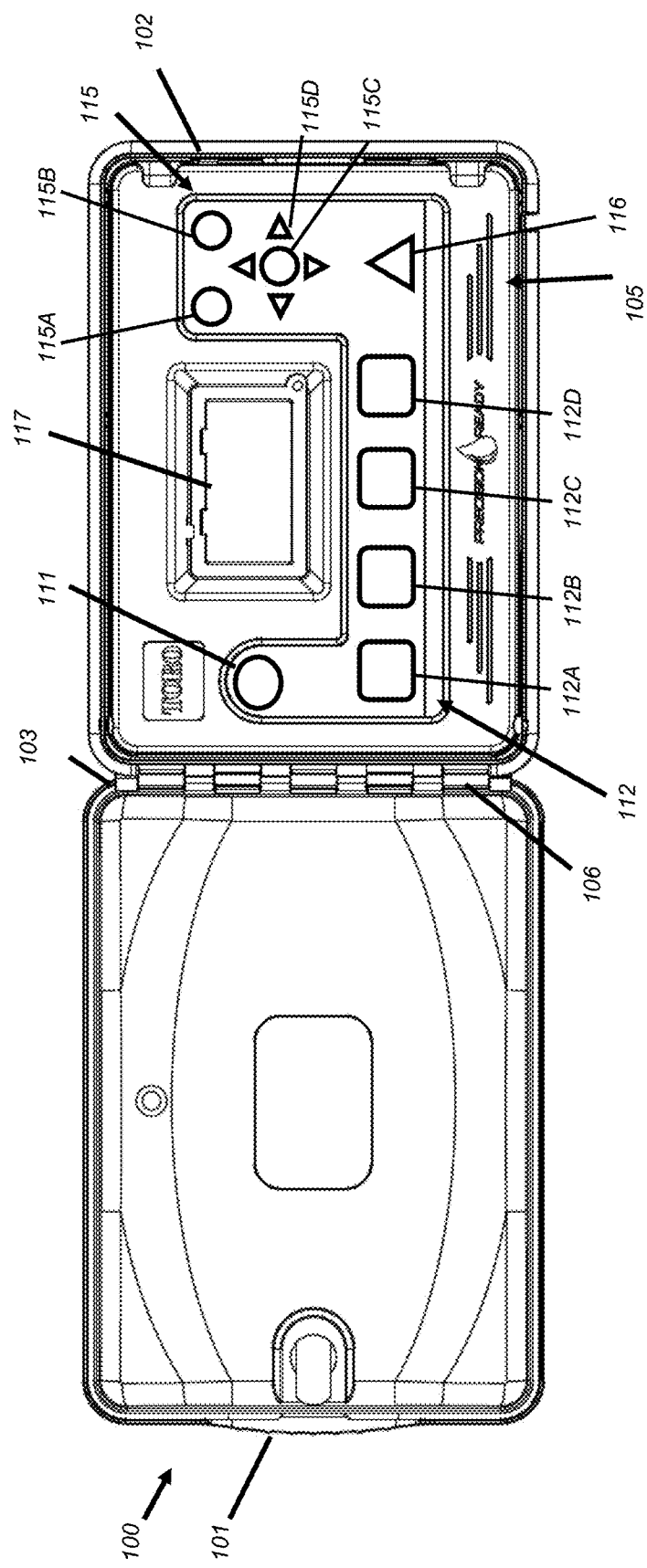
FIG. 5 illustrates a front view of the modular controller of FIG. 1 with the front housing open.
Figure 6:
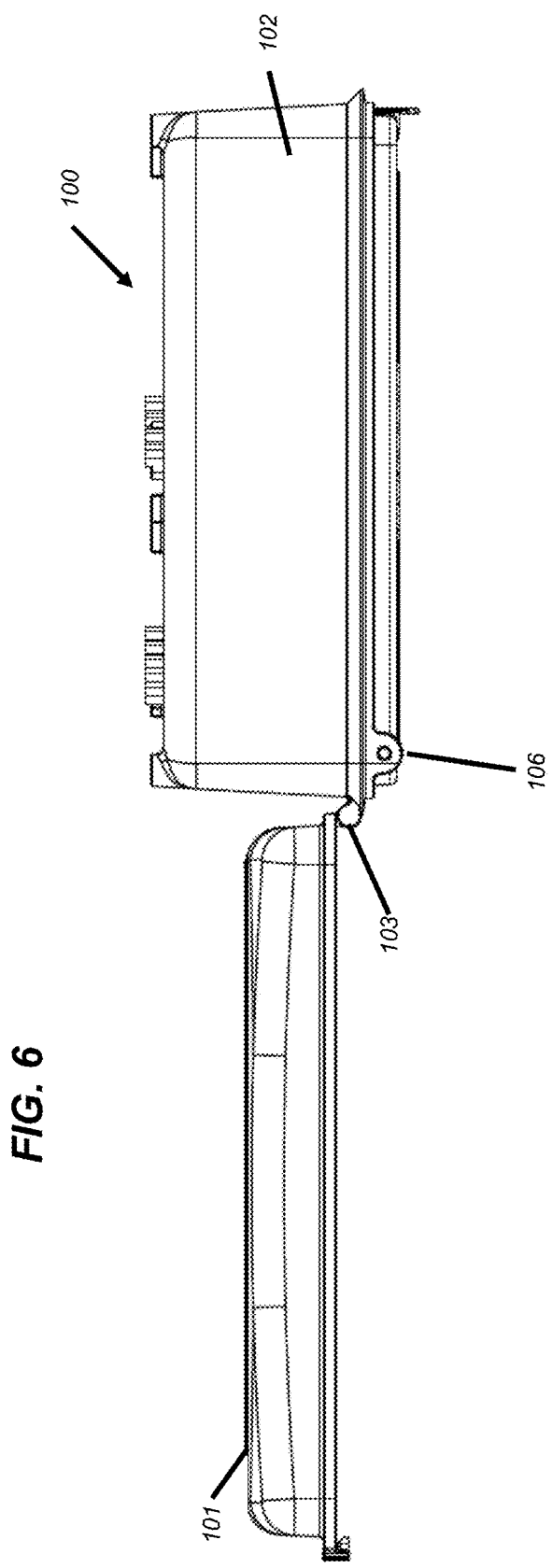
FIG. 6 illustrates a top perspective view of the modular controller of FIG. 5.
Figure 7:
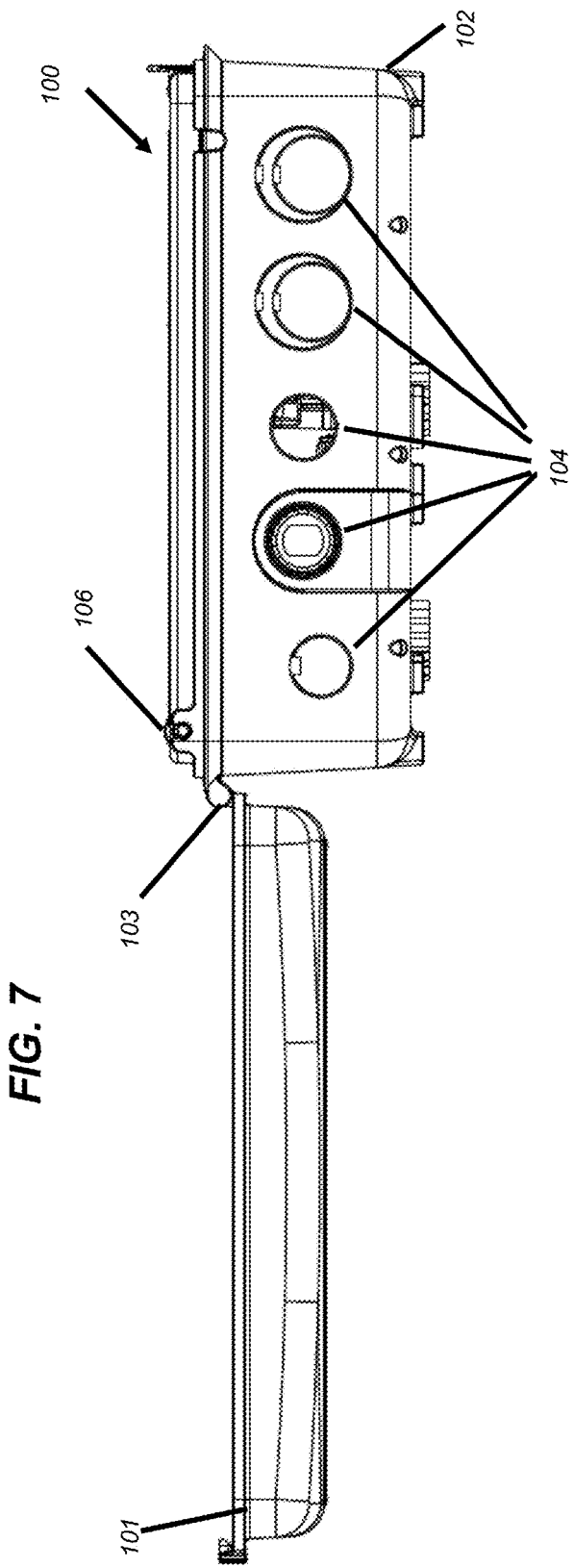
FIG. 7 illustrates a bottom perspective view of the modular controller of FIG. 5.
Figure 8:
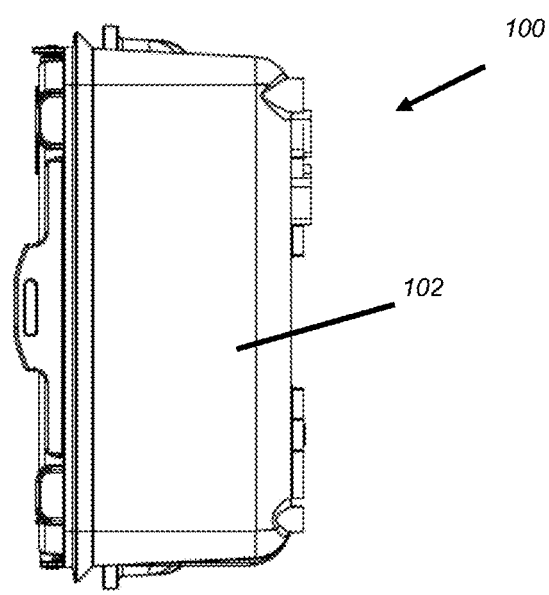
FIG. 8 illustrates a side perspective view of the modular controller of FIG. 5.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

FIGS. 1-4 illustrate various outer views of a modular controller 100 according to the preset invention. The modular controller 100 includes a front cover 101 and rear housing 102 that protect the components of the controller 100. The front cover 101 is attached to the rear housing by a hinge 103 which allows the front cover 101 to swing open and closed over the controller console 105 (seen best in FIG.

5). Wire apertures 104 allow irrigation station wires to enter the controller 100 and thereby connect to controller terminals.

FIGS. 5-8 illustrate the controller 100 with the front cover 101 open to reveal the controller console 105. The console 105 is attached to the rear housing by an inner controller hinge 106 which allows the console to swing open and closed over the rear housing 102.

FIGS. 9-12 illustrate the controller 100 with both the front cover 101 and console 105 open to reveal the controller components contained within the rear housing 102, including both fixed terminals 107 and a module connection area 180. Preferably, the fixed terminals 107 include power terminals for connecting a power supply to power the controller 100, sensor terminals for connecting a sensor, communication ports for connecting a remote control, and irrigation station terminals 107A (e.g., four of the bottom right terminals 107) for connecting to irrigation valves.

Figure 9:
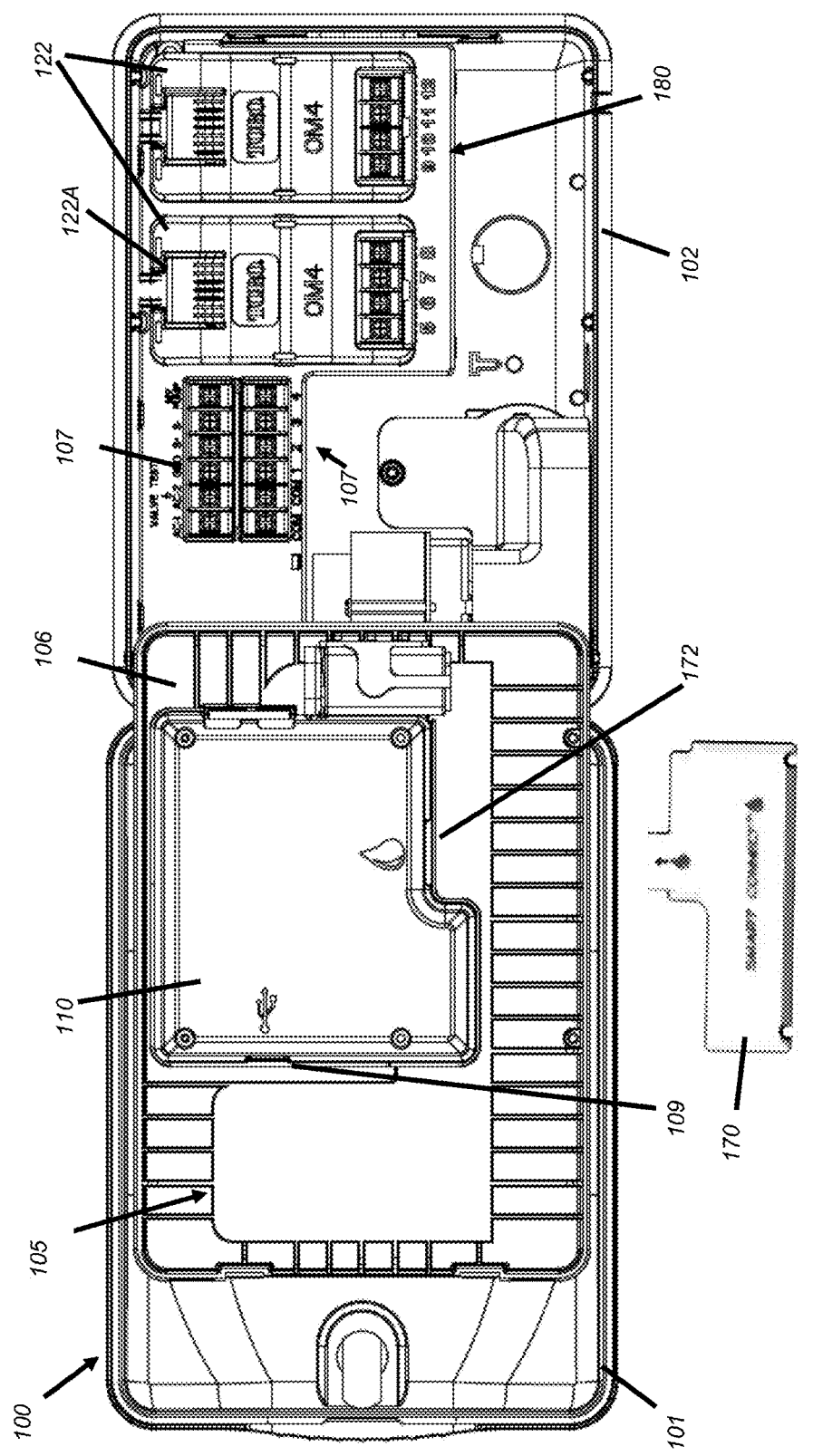
FIG. 9 illustrates an interior perspective of the modular controller with the front cover open and console open, showing two 4-port modules attached to the rear housing.
Figure 10:
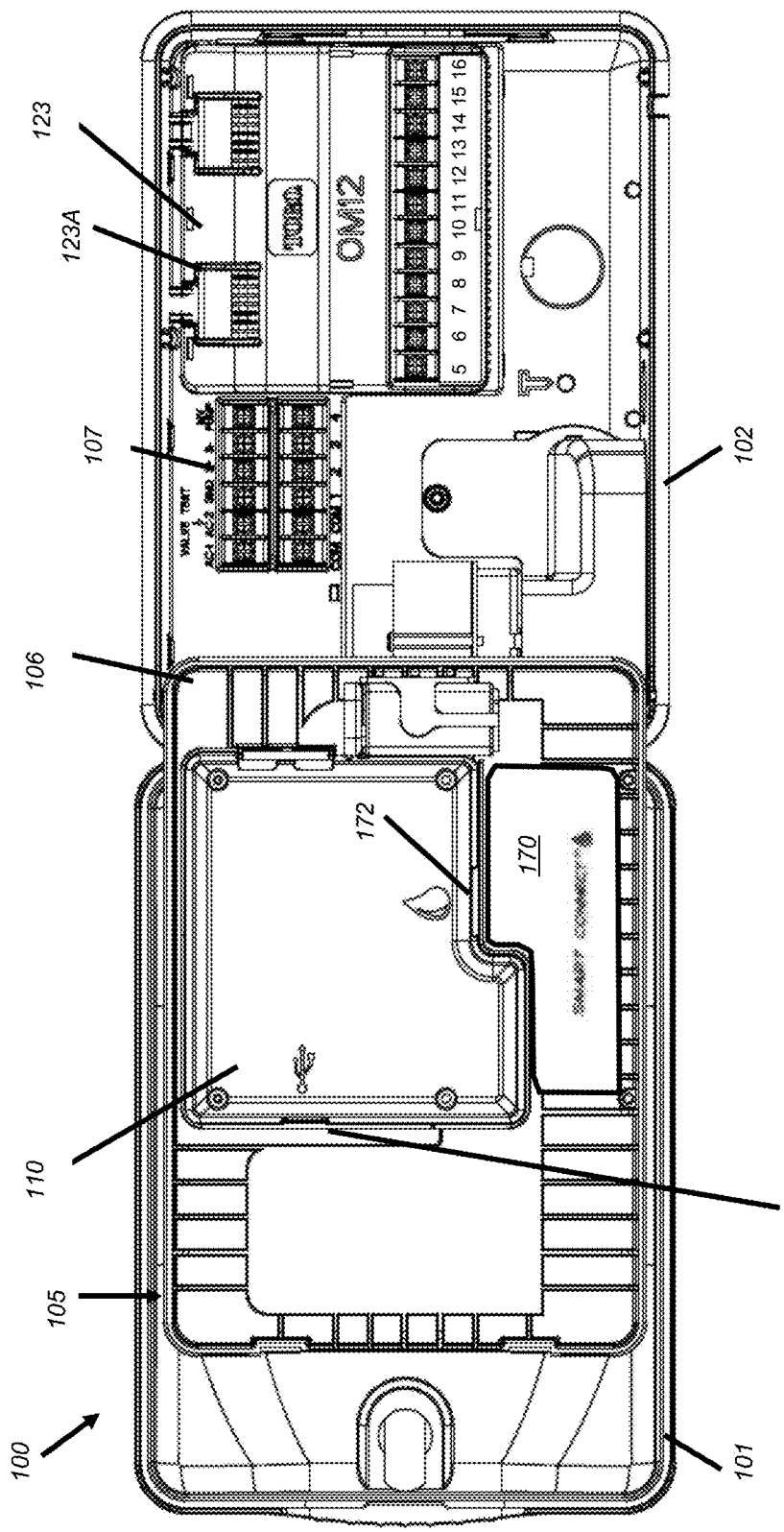
FIG. 10 illustrates an interior perspective of the modular controller with the front cover open and console open, showing one 12-port module attached to the rear housing.
Figure 11:
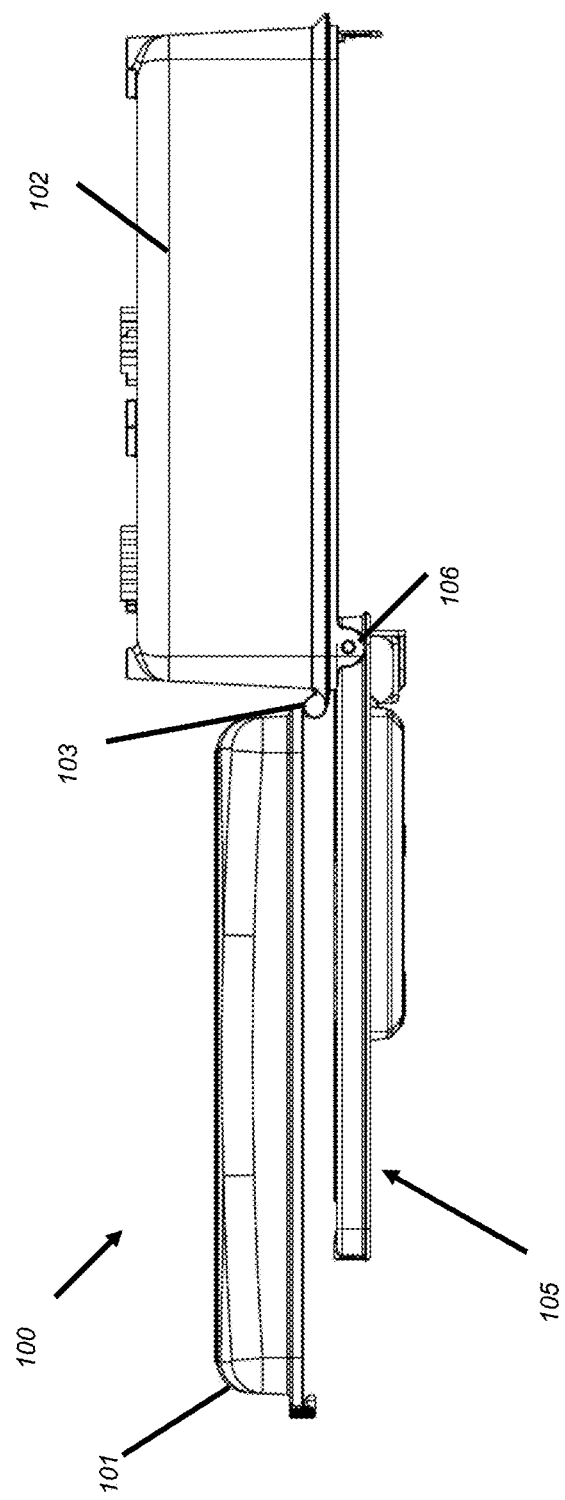
FIG. 11 illustrates top perspective view of the modular controller with the front cover open and console open.
Figure 12:
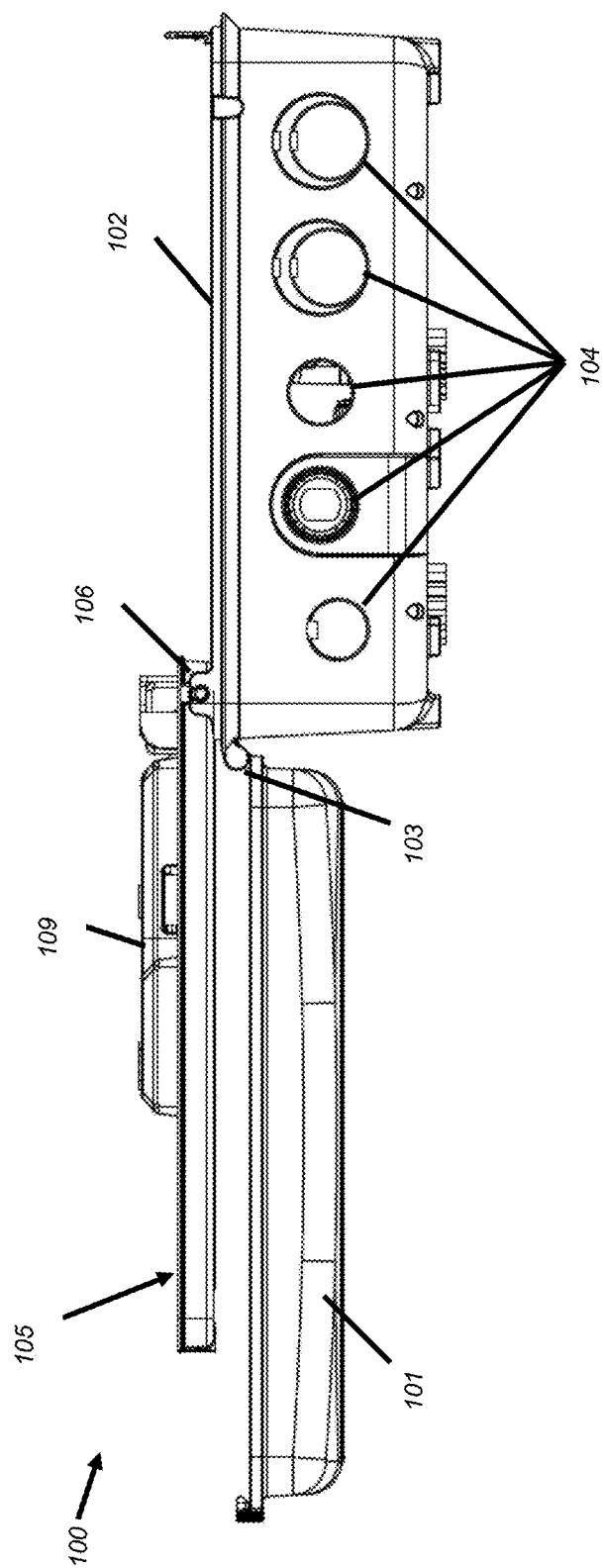
FIG. 12 illustrates a bottom perspective view of the modular controller with the front cover open and console open.
Figure 13:
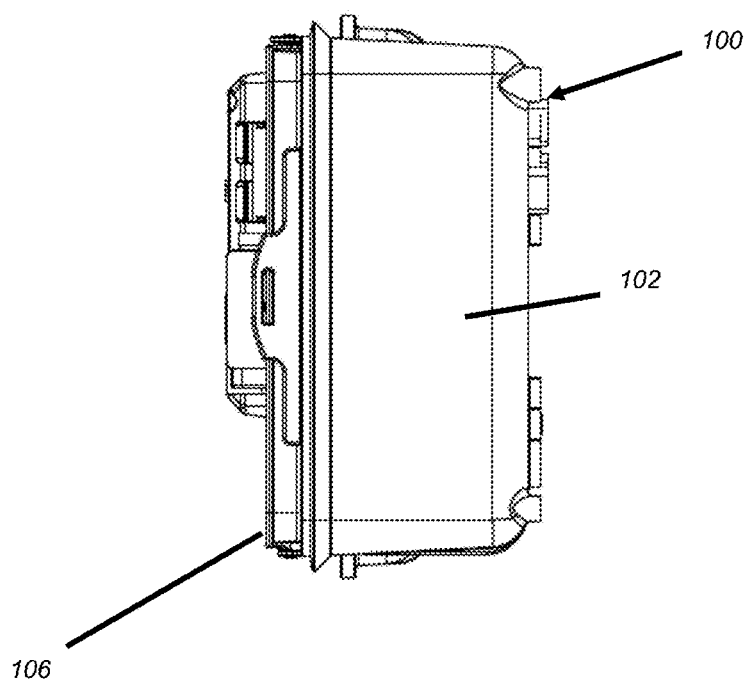
FIG. 13 illustrates an interior perspective of the modular controller with the front cover open and console open.
Figure 14:
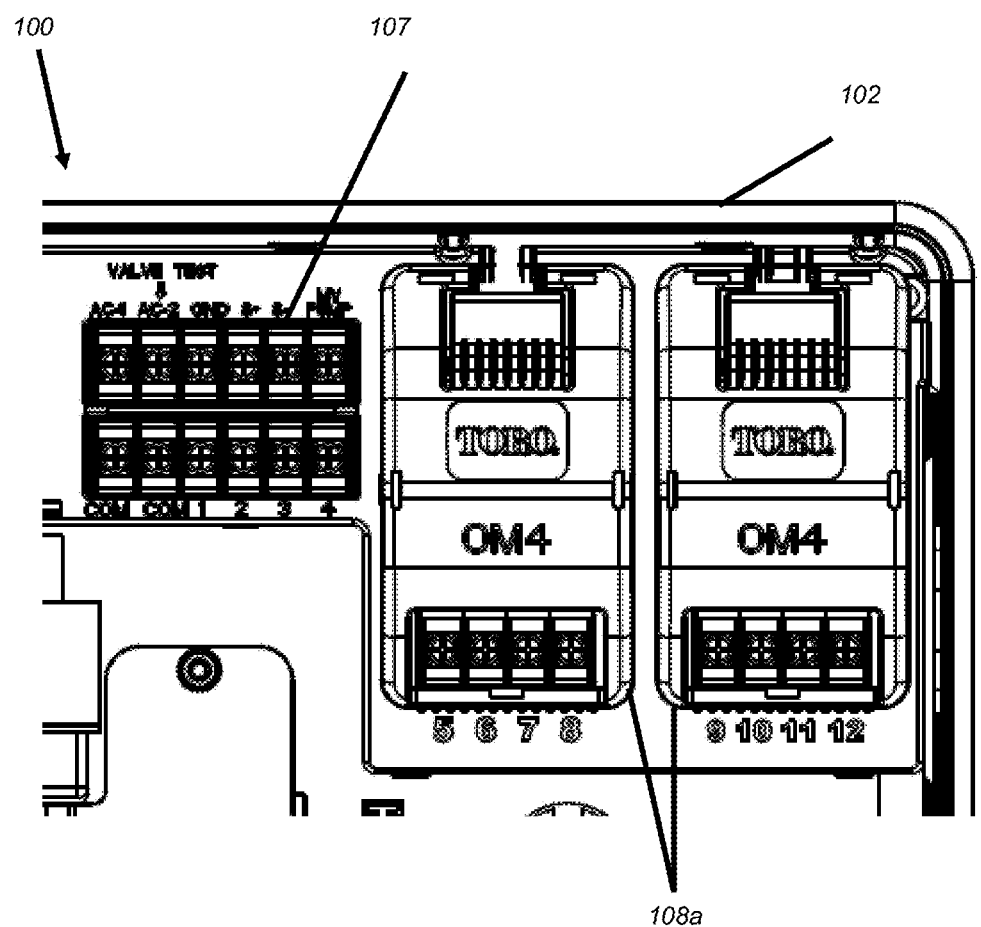
FIG. 14 illustrates a close up perspective view of the controller components within the rear housing.

As best seen in FIG. 9, the module connection area 180 can accommodate up to two smaller modules 122 (e.g., each having four irrigation station terminals), which allows for incrementally adding irrigation station terminals to the controller 100 (in addition to the irrigation station terminals of the fixed terminals 107). The module connection area 180 can also accommodate a larger, single module 123 that spans the entire width of the area 180, as seen in FIG. 10, and includes more irrigation station terminals than both modules 108a (e.g., twelve irrigation station terminals). Preferably the modules 122, 123 are engaged with one or more spring clips 122A, 123A at their upper end. Preferably, electrical connection terminals are located on area 180 and the underside of each of the modules 122, 123, so as to allow electrical communication with the modules 122, 123 with the controller 100.

Preferably, the area 180 includes a plurality of indicia (e.g., numbering 1-12) located at its lower end such that when one or more modules 122 are connected, the indicia line up beneath each of the terminals. In contrast, module 123 is preferably longer so as to cover up these indicia, but provides a second set of indicia located on the face of the module 123, below its terminals. In this regard, the different terminal spacing between the different sized modules 122 and 123 can nonetheless both have indicia accurate to their respective terminals.

As best seen in FIGS. 9 and 10, the console 105 includes a Smart Card adapter port 172 within the body of the console 105 which allows a Smart Card 170 to connect (FIG. 10) and provide additional functionality to the controller 100. For example, the Smart Card 170 may include a wireless transceiver for communicating with a weather station, soil moisture sensor, ET data, flow sensor, remote control, or PC. The controller 100 can receive this data and act accordingly. For example, the controller 100 may receive ET data from a local weather station and thereby adjust the schedule appropriately. In another example, the controller 100 may receive soil moisture data and similarly adjust the schedule as needed. In another example, the controller may communicate with software on a PC for scheduling the controller's irrigation schedule and setting up other aspects of the controller's functionality, such as sensor configuration.

Two-Wire Decoder Capability

Irrigation controllers with conventional irrigation stations open and close irrigation valves by selectively applying electric current (e.g., 24V AC) over at least one dedicated wire connected to each valve. In this respect, when power is applied to a certain valve, it remains open and when power is stopped, the valve closes. In contrast, advanced decoder-based systems supply constant power (e.g., constant AC or DC power) and encoded data over a single wire pair. Each valve includes a data decoder that draws power and decodes data from the single wire pair. When a decoder receives a watering command, it causes its attached valve to open. Since irrigation systems and valves must be wired differently, irrigation controllers have typically been configured for use only with traditional systems or with decoder systems.

The present controller 100 allows a user to change the output of at least some of the irrigation station terminals between a conventional 24V AC output and a constant decoder-style output. In this respect, the controller 100 can be used with either style irrigation system or even a combination of the two (i.e., two of the fixed terminals 107 output decoder format commands and the terminals of the modular controllers 108a output conventional 24V AC).

When set to its "decoder" output mode, the designated decoder terminals of the fixed terminals 107 may also communicate with irrigation sensors configured to communicate with this protocol. In this way, the user has greater flexibility to add sensor input into the controller system to adjust to various environmental changes.

Preferably, a user can change the designated fixed terminals 107 from conventional to decoder via a mechanical switch, a jumper or a firmware setting accessible within a graphical user interface of the controller.

Dual User Console and Menu System

Figures 15, 16:
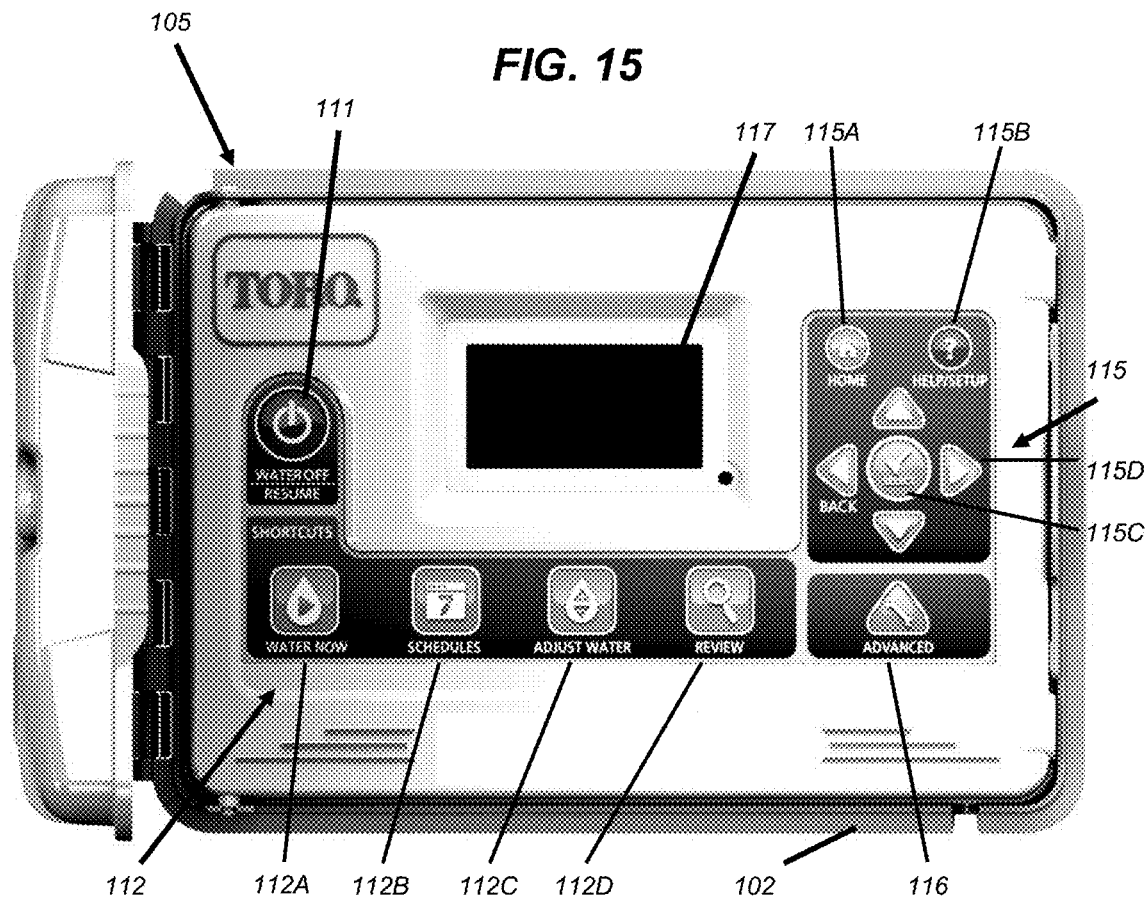
FIG. 15 illustrates the controller console interface.
FIG. 16 illustrates the Contractor's initial "Advanced" menu screen.

The interface console 105, best seen in FIG. 15, is designed to accommodate both the basic "Homeowner" and advanced "Contractor" user by providing different interfaces for each user to input irrigation scheduling data into the controller 100. Hence, a simpler graphical interface can be provided on screen 117 for the casual "Homeowner" users (e.g., access to system information and most commonly used features) and a more detailed graphical interface can also be provided for the advanced "Contractor" user (e.g., to access complicated or detailed settings for fine tuning an irrigation schedule).

A typical "Homeowner" primarily performs only a few controller functions on a regular basis. Accordingly, the "Homeowner" has immediate access to a series of "shortcut" buttons 112 (seen best in FIGS. 5 and 15) that include "Water Now" 112A, "Schedules" 112B, "Adjust Water" 112C, and "Review" 112D, as well as a dedicated water shut-off button 111, a "Home" button 115A, "Help/Setup" 115б, and menu navigation buttons 115 (e.g., arrows 115D and select button 115C). In contrast, the "Contractor" has a dedicated "advanced" button 116 to access the advanced features of the controller as well as more convenient screens for them to enter data. When pressed, the "Homeowner" is deterred by the title of the button ("Advanced") and a secondary clarification screen as shown in FIG. 16.

Figure 17A:
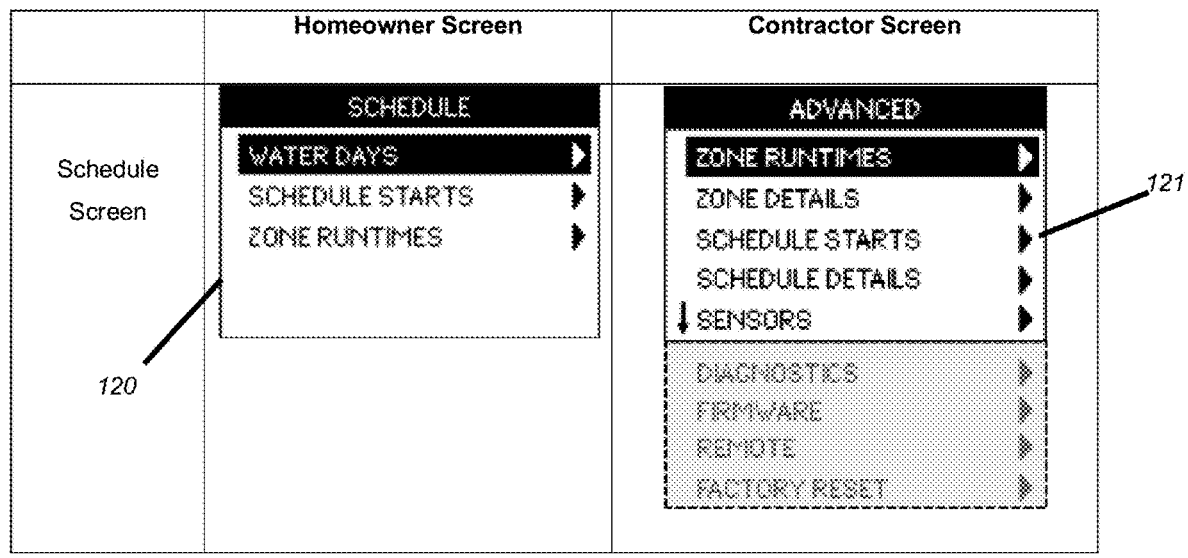
FIG. 17A illustrates the "Schedule Screen" for the "Homeowner" user and the "Contactor" user.
Figure 17B:
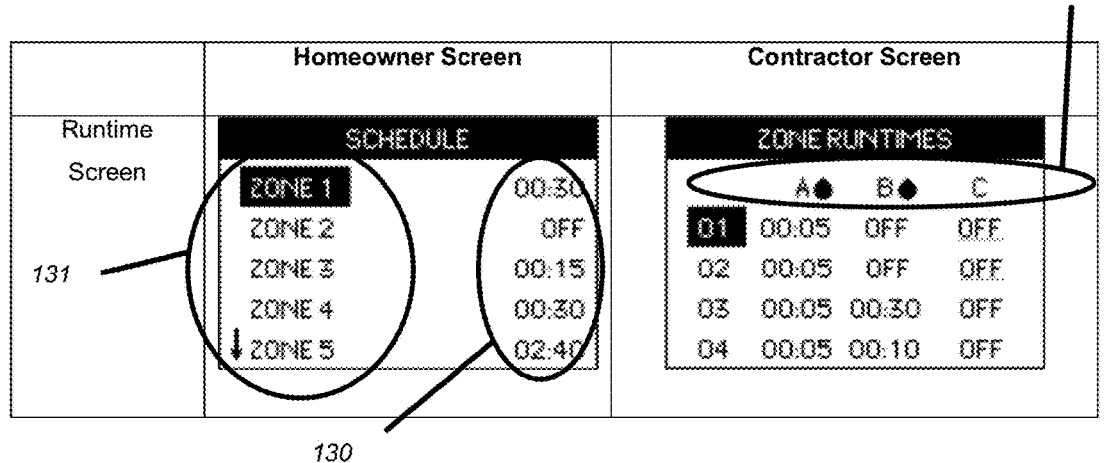
FIG. 17B illustrates the "Runtime Screen" for the "Homeowner" user and the "Contactor" user.
Figure 17C:
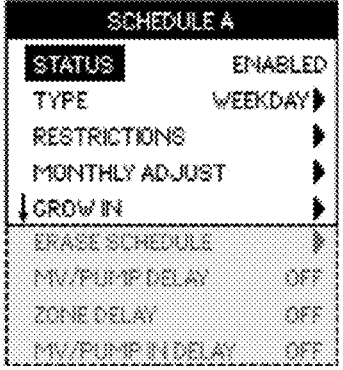
FIG. 17C illustrates the "Area Screen" for the "Homeowner" user and the "Contactor" user.

Pressing the "Help/Setup" shortcut button 115б or the "Advanced" button 116 (and advancing through the confirmation screen of FIG. 16) allows the user to access various system options for program modification and review. FIGS. 17A through 17C illustrate several of the differences between the simplified "Homeowner" menu and the more complex "Contractor" menu. The "Homeowner" menu offers diminished operational functionality but more detailed description of the available options. In contrast, the "Contractor" menu offers more functionality to accommodate the advanced features while limiting the description to allow the "Contractor" to navigate through the menu faster.

For example, the "Schedule Screen" for both the "Homeowner" and "Contractor" is shown in FIG. 17A. The "Homeowner" "Schedule Screen" offers the basic area selections 120 for setting up a schedule such as choosing selecting the "Watering Days," "Schedule Starts," and "Zone Runtimes." The "Contractor" "Schedule Screen" offers additional features such as a "Zone Details," "Schedule Details," "Sensors." "Diagnostics," "Firmware," "Remote," and "Factory Reset" in selections 121.

Similarly, in FIG. 17B the "Homeowner" "Runtime Screen" provides the watering duration 130 for different zones 131 while the "Contractor" "Runtime Screen" provides the duration runtimes for multiple schedules 132 (for example schedule A, B, and C) for each watering zone 131. Additionally, the users may create custom names for each zones 131 to make the naming of "Areas" and "Schedules" more meaningful. These custom labels may be used with an external software program to replace the generic labels in the controller.

FIG. 17C illustrates that the "Homeowner" does not have an "Area Screen" whereas the "Contractor" has multiple options for adjusting the watering schedule for a given zone based on soak time, sprinkler type, precipitation rate, soil and plant type, terrain slope, and sun light level.

Graphical Schedule for Volumetric Programming

Figure 18A:
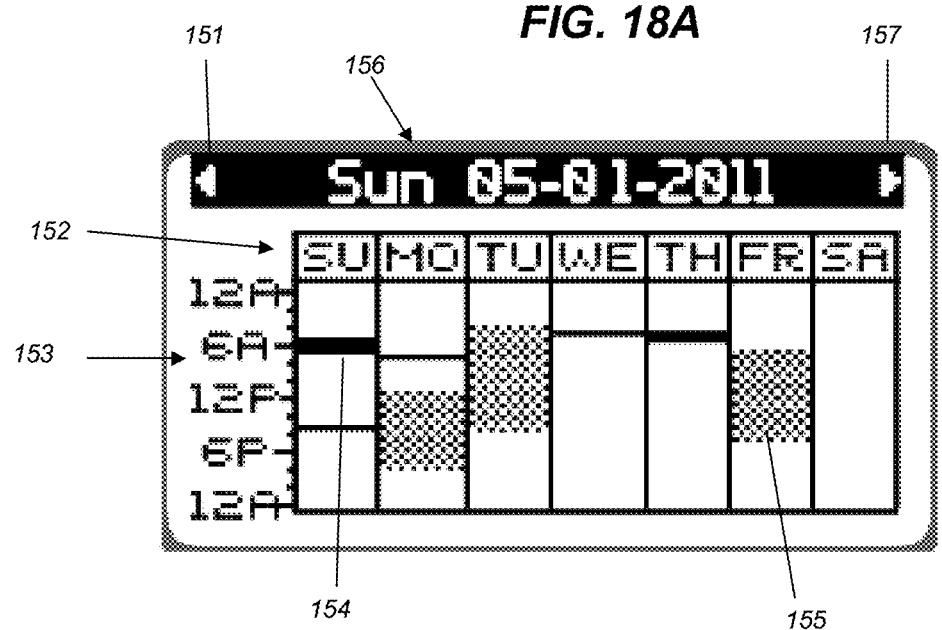
FIG. 18A illustrates the controller's watering schedule based on a week view.
Figure 18B:
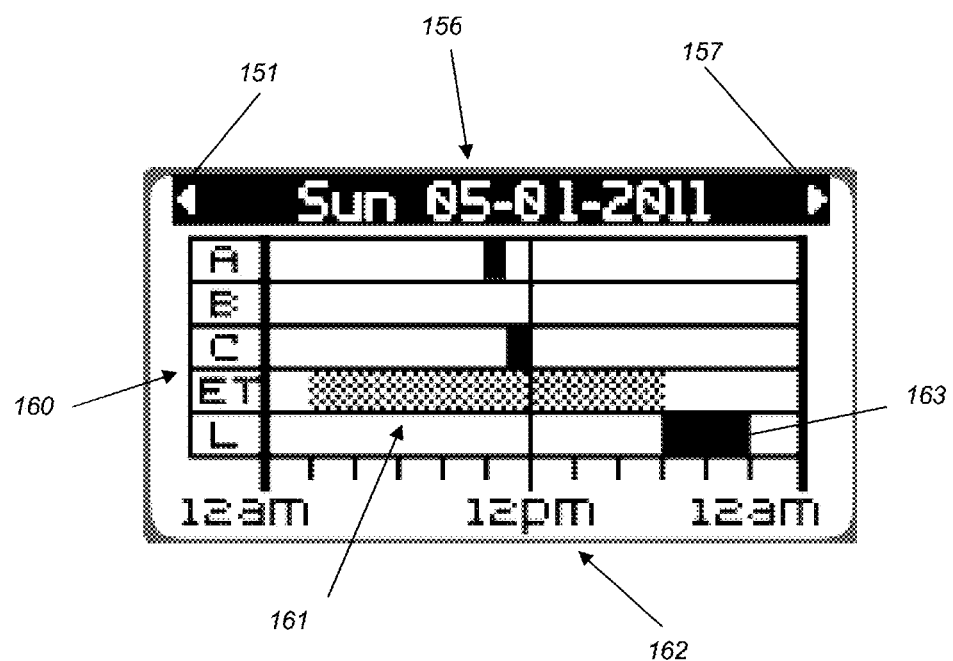
FIG. 18B illustrates the controller's watering schedule based on a day view.

The controller 100 preferably displays the irrigation schedule in a graphical format to ensure that a given area is receiving the proper irrigation volume, as seen best in FIGS. 18A and 18B. Turning first to FIG. 18A, the "Week View" format includes columns of the days of the week 152 and a vertical time scale 153 showing 24 hour increments.

A solid black bar 154 indicates standard activation of irrigation valves by the controller from any valve or program. The height of the bar reflects the total runtime the controller is planned to run (or has run if this week has occurred in the past). The cross-hatched area 155 indicates a time frame that irrigation valves may possibly irrigate based on sensor inputs to the controller (i.e. for example, ET or soil moisture values). This is the allowable watering time frame that the user could expect watering to occur. Indicator arrows also allow the user to change the view to the schedule of the previous week 151 or the following week 157.

The user may navigate to a particular day 156. Once activated the "Week View" screen would change to the "Day View" screen as shown in FIG. 18B. The top of the "Day View" schedule indicates the day that the data shown relates to. Each row in the "Day View" screen represents the different scheduled programs 160 in the irrigation schedule. These may also include lighting and accessory schedules. Similar to the "Week View" schedule, the "Day View" schedule is based on a 24-hour time scale 162, the solid black bar 163 indicates standard activation of irrigation valves by the controller for a particular schedule, and the cross-hatched area 161 indicates a time frame that irrigation valves for the particular schedule may possibly irrigate based on inputs to the controller. Indicator arrows allow the user to change the view to the schedule for the previous day 164 or for the following day 166. The graphical display provides the user with an intuitive understanding when each zone within the irrigation system will be active in a particular week or day. Additionally, the data displayed can be what has actually run, what was planned but modified, and what is expected to run in the future.

Customer Service Capability

In one embodiment, the controller 100 has both a microphone and speaker within the case, whose hardware is attached to the controller's circuit board. This communication setup, identified as a "Voice of the Customer" feature, allows users the ability to contact a customer service representative (CSR) directly from the controller 105 to quickly address an irrigation system issue. Users may initiate the "Voice of the Customer" feature by pressing the help button 112 on the console 105 (see FIG. 15). After confirmation, the controller 100 calls a programmed phone number or initiates a call over the internet to a predetermined address.

Once connected with a CSR, the user can explain the issue affecting the system and can be walked through trouble shooting steps and programming instructions. In addition, the data communication aspect allows the user to upload the controller schedule and settings data to a network storage server so that a CSR may review and reprogram the controller 100 remotely. Once the CSR has modified and corrected the controller issue, the modified irrigation schedule and settings may be downloaded from the server back to the controller through the existing installed communication protocol (for example, WiFi). Utilizing either voice or data communication aspects of the "Voice of the Customer" feature allows the user to confirm that an issue has been addressed correctly.

Removable Memory

In another aspect according to the present invention, the controller 100 stores data on a removable memory device such as an SD card, Micro SD card, or USB memory device. Utilizing these widespread portable storage devices is advantageous because the data collected may be analyzed at a remote location instead of at the controller (e.g., by transferring data over the internet to a CSR, as previously discussed, or by removing the memory and using a stand-alone device or computer software for further analysis).

The use of a USB memory device is illustrated in FIGS. 9 and 10, which shows a USB port 109 and SD card slot 174 on the rear of the console 105. Data collected may include irrigation scheduling information, logged irrigation events, logged alerts, logged sensor readings or the resultant adjustments based on sensor data, and logged communication events with a CSR. The data can be used for saving irrigation schedules remotely in order to reload them at a later date to restore the controller to a particular operation schedule (e.g., due to user error or replacement of the controller), or may be used by a secondary application to troubleshoot controller issues and display sensor data such as flow reports or ET adjustment values over time. Further, the data collected may be uploaded to a Toro network server via a data communication protocol discussed above. A CSR can then provide analysis and support to the user regarding irrigation controller 100 operation.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. An irrigation controller comprising:
   a user interface having a plurality of interface elements for programming an irrigation schedule;
   a controller housing connected to said user interface surface;
   a module connection area located in said controller housing; said module connection area comprising a first module area having an electrical connection terminal and a physical connection mechanism;

a first plurality of number indicia displayed on said first module area and each of which being located in said first module area such that, when a first module is connected to said first module area, each of a first plurality of irrigation terminals are positioned adjacent to one of said first plurality of number indicia, and;

a second plurality of number indicia displayed on a second module adjacent to a second plurality of irrigation terminals;

wherein, said second module covers said first plurality of number indicia when connected to said first module area.

2. The irrigation controller of claim 1, wherein said second module has a different number of irrigation terminals than said first module.

3. The irrigation controller of claim 2, wherein said second module has a larger number of irrigation terminals than said first module.

4. The irrigation controller of claim 1, wherein said first plurality of number indicia are positioned adjacent to a bottom of said first module when said first module is connected to said first module area.

5. The irrigation controller of claim 4, wherein said second module has a greater length than said first module; and wherein said second module is positioned over said first plurality of number indicia when connected at said first module area.

6. The irrigation controller of claim 1, further comprising:
a second module area having a second electrical connection terminal and a second physical connection mechanism;
said first module area and said second module area each configured to simultaneously accommodate said first module; said first module having a first width
said first module area and said second module area configured to both simultaneously accommodate said second module that has a second width extending entirely across said first module area and said second module area;
wherein two of said first irrigation modules have a total number of irrigation terminals less than one of said second module.

7. The irrigation controller of claim 1, wherein said controller has a mechanical switch capable of changing any two fixed stations to a decoder driven system.

8. The irrigation controller of claim 1, wherein said first module has at least four irrigation terminals and wherein said second module has at least eleven irrigation terminals.

9. An irrigation controller comprising:
a user interface having a plurality of interface elements for programming an irrigation schedule;
a controller housing connected to said user interface surface;
a module connection area located in said controller housing; said module connection area comprising a first module area having an electrical connection terminal and a physical connection mechanism;
a first plurality of number indicia displayed on said first module area and each of which being located in said first module area such that, when a first module is connected to said first module area, each of a first plurality of irrigation terminals are positioned adjacent to one of said first plurality of number indicia, and;
a second plurality of number indicia displayed on a second module adjacent to a second plurality of irrigation terminals;
wherein, said second module prevents said first plurality of number indicia from being visible when connected to said first module area.

10. The irrigation controller of claim 9, wherein said second module has a different number of irrigation terminals than said first module.

11. The irrigation controller of claim 10, wherein said second module has a larger number of irrigation terminals than said first module.

12. The irrigation controller of claim 9, wherein said first plurality of number indicia are positioned adjacent to a bottom of said first module when said first module is connected to said first module area.

13. The irrigation controller of claim 12, wherein said second module has a greater length than said first module; and wherein said second module is positioned over said first plurality of number indicia when connected at said first module area.

14. The irrigation controller of claim 9, further comprising:
a second module area having a second electrical connection terminal and a second physical connection mechanism;
said first module area and said second module area each configured to simultaneously accommodate said first module; said first module having a first width
said first module area and said second module area configured to both simultaneously accommodate said second module that has a second width extending entirely across said first module area and said second module area;
wherein two of said first irrigation modules have a total number of irrigation terminals less than one of said second module.

15. The irrigation controller of claim 9, wherein said controller has a mechanical switch capable of changing any two fixed stations to a decoder driven system.

16. The irrigation controller of claim 9, wherein said first module has at least four irrigation terminals and wherein said second module has at least eleven irrigation terminals.

* * * * *